United States Patent [19]
Sager

[11] Patent Number: 5,812,810
[45] Date of Patent: *Sep. 22, 1998

[54] INSTRUCTION CODING TO SUPPORT PARALLEL EXECUTION OF PROGRAMS

[75] Inventor: David J. Sager, Acton, Mass.

[73] Assignee: Digital Equipment Corporation, Maynard, Mass.

[*] Notice: The term of this patent shall not extend beyond the expiration date of Pat. No. 5,717,883.

[21] Appl. No.: 270,185

[22] Filed: Jul. 1, 1994

[51] Int. Cl.[6] .................................................. G06F 9/38
[52] U.S. Cl. ...................... 395/392; 395/391; 395/800.23
[58] Field of Search ............................ 364/200; 395/375, 395/500, 800.23, 391, 570, 392; 370/94.1

[56] References Cited

U.S. PATENT DOCUMENTS

| | | | |
|---|---|---|---|
| 4,847,755 | 7/1989 | Morrison et al. | 395/379 |
| 5,021,945 | 6/1991 | Morrison et al. | 395/392 |
| 5,202,975 | 4/1993 | Rasbold et al. | 395/685 |
| 5,226,126 | 7/1993 | McFarland et al. | 395/394 |
| 5,251,306 | 10/1993 | Tran | 395/393 |
| 5,261,067 | 11/1993 | Whelan | 711/141 |

OTHER PUBLICATIONS

Hennessy et al "Computer Architecture A Quantitative Approach", 1990, p. 264.
Lightner et al., The Metaflow Lightning Chipset, 1991, pp. 13–18.
Jefferson, Virtual Time, 1985, pp. 404–425.
Popescu et al., The Metaflow Architecture, 1991, pp. 10–13, 63–73.

Primary Examiner—Parshotam S. Lall
Assistant Examiner—Kenneth R. Coulter
Attorney, Agent, or Firm—Anne E. Saturnelli

[57] ABSTRACT

A computer system with multiple execution boxes operates by assigning serial numbers to each instruction in a set of linearly dependent computer instructions and then rearranging those instructions into a set of instructions which are no longer linearly dependent. The original serial numbers assigned to each instruction are retained with the instructions after rearrangement. The serial numbers allow reconstruction of the original set of instructions from the rearranged set of instructions. Once rearranged, additional information is added to subsets of the rearranged set of instructions. The additional information allows several instructions to be executed in parallel while producing the same results as would have been produce had the instructions been executed one at a time by a sequential processor.

14 Claims, 4 Drawing Sheets

INSTRUCTION CODING TO SUPPORT PARALLEL EXECUTION OF PROGRAMS

BACKGROUND OF THE INVENTION

This invention relates generally to computer systems and more particularly to parallel processing of computer program instructions.

As it is known in the art, computer systems generally include at least one central processing unit (CPU), a memory, and some type of mass storage device such as a disk drive. A typical computer operates by reading and executing program instructions which have been read from a mass storage device and placed in the memory. Through a combination of user interaction and program execution, the user is typically provided a desired result.

A computer program is a series of instructions which are usually written by a person skilled in the art of computer programming. The programs are typically written in a so called high level programming language such as "C", "Pascal", or "Fortran". High level programming languages are languages whose instructions are easily read and understood by a person with training in the particular language. Once a program has been written, it is then processed by a so called compiler.

A compiler, which is written for one of several high level programming languages, reads the high level program instructions and converts them into so called machine instructions. Machine instructions are instructions that are readable and executable by a central processor (CPU). When a user invokes a program, the CPU will cause the compiled instructions to be read into the memory and executed.

Most computer programs which are executed on typical computer systems require that the operations be executed in a generally serial fashion. In other words, the program must be executed one instruction after another until the desired result is obtained. The exception occurs when, during the course of execution, an instruction causes a so called branch, jump, or exception.

A branch occurs when a section of instructions needs to be skipped or when a section of instructions located in a different part of the program needs to be executed. An example of a situation where a section of code will be skipped is illustrated by the so called "goto" programming step. The "goto" is used to execute a set of instructions which does not immediately succeed the instruction which has just been executed. The instructions beginning at the destination of the goto instruction are executed in serial fashion.

A typical central processing unit includes several processing stages which make up a so called pipelined system. The processing stages normally associated with a typical central processing unit include a so called Instruction cache (I-cache), one or more so called Execution boxes (E-box), a so called Cache box (C-box), and various logic circuits to control the flow and issue of program instructions from the I-cache to the E-boxes.

The purpose of providing a piplelined system is to avoid the latency delays associated with completely processing a single instruction before fetching the next instruction. Processing a single instruction may require many clock cycles. Rather than have one clock cycle only be useful for processing one instruction, pipelined systems allow that the processing of instructions be broken down into smaller discrete operations providing for a portion of many instructions to be processed simultaneously. Generally, the discrete operations include reading instructions into the instruction cache, reading an instruction from the instruction cache and issuing the instruction to the execution box, and executing the instructions accordingly. This method of pipelining instructions results in a faster more efficient central processor.

Although the pipelined model has provided for faster computer systems, general purpose computers are still limited in that they can only execute one or in some advanced computer systems two instructions per clock cycle. It would be advantageous to be able to execute many instructions per clock cycle and thereby dramatically increase the speed at which a computer would perform its various functions.

A major obstacle in the way of parallel execution of many instructions is the organizational structure of conventional computer programs. As compiled, conventional computer programs present a linearly or sequentially ordered set of instructions which must be executed in the order presented to insure production of a correct or expected result. Although the computer hardware may be capable in some respect of executing more than one instruction at a time, taking a group of sequentially dependent instructions and executing them in parallel most often produces incorrect results since one instruction is often dependent on the completion of the instruction sequentially preceding it.

There have been various attempts at designing computer systems which overcome this problem of sequential dependence. However, these systems often require complex hardware designs which must be capable of on-the-fly reordering of instructions. Some designs simply do not guarantee a correct result for general purpose type computer programs or, in order to guarantee a correct result allow for a very limited amount of rearrangement of the computer instructions resulting in a limited amount of parallel execution.

SUMMARY OF THE INVENTION

In accordance with the present invention a method of operating a computer system includes the steps of adding a first type of information to a set of linearly dependent computer instructions with the added information corresponding to the order in which the computer instructions are arranged. The method further includes the step of rearranging the set of linearly dependent computer instructions into a set of non-linearly dependent instructions which permits reconstruction of the set linearly dependent set of instructions from the rearranged instructions. After the computer instructions are rearranged, additional information is added to the rearranged instructions. After the additional information is added to the rearranged instructions, they are provided to a computer processor which executes a several of the instructions simultaneously. With such an arrangement, general purpose computer programs can be executed by processors having parallel processing capabilities while achieving the same results or outputs as would be achieved by executing the general purpose program in a linear fashion, one instruction at a time. Additionally the speed at which the general purpose program is executed is substantially increased since the program can now be executed on a parallel processor which permits multiple issue and execution of computer instructions during a common processor cycle.

In accordance with a further aspect of the present invention, a computer system includes means for providing from a first set of computer instructions arranged in a linearly dependent order, a second set of computer instructions. The second set of computer instructions is a nonlinearly dependent rearrangement of the first set of computer instructions. Additionally, means are provided for executing several of the second set of computer instructions simultaneously. Although rearranged and executed in groups, the computer system produces the same result as would be achieved had the first set of linearly dependent instructions been executed one instruction at a time and in a linear fashion. With such an arrangement, a computer system is provided which allows general purpose computer programs which previously required execution by a sequential processor can now be executed in a parallel fashion thereby drastically increasing the speed at which the program is run.

BRIEF DESCRIPTION OF THE DRAWINGS

The above-mentioned and other features of the invention will now become more apparent by reference to the following description taken in connection with the accompanying drawings in which.

DETAILED DESCRIPTION OF THE PREFERRED EMBODIMENT

Figure 1:
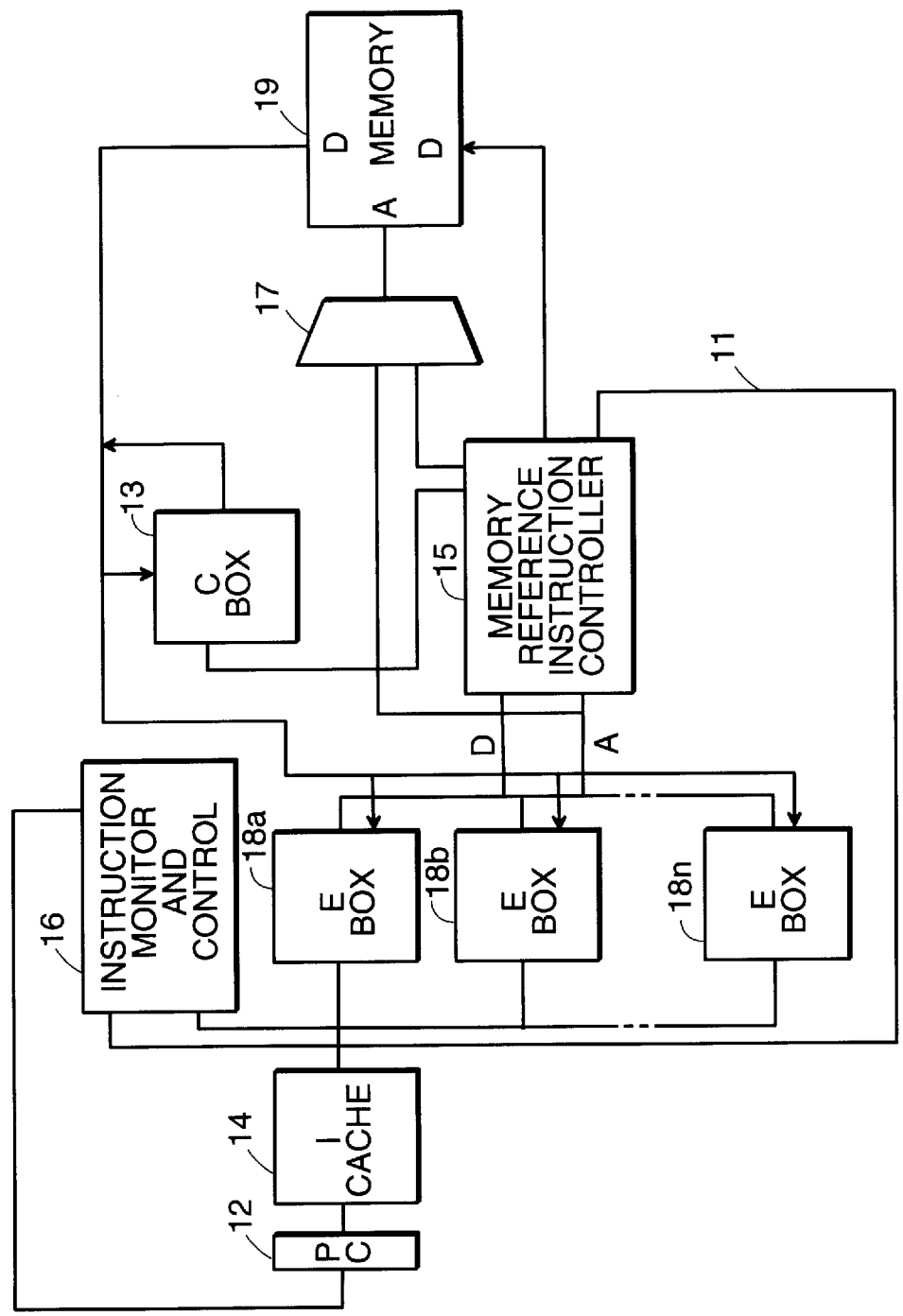
FIG. 1 is a block diagram of a computer system capable of executing several instructions during each process cycle.

Referring to FIG. 1, a computer system 10 is shown to include a program counter (PC) 12, an instruction cache (I-Cache) 14, a plurality of execution boxes (E-boxes) 18a–18n, a cache box (C-box) 13, memory ordering exception signal lines 11, and a memory 19. In normal operation, computer multiple instructions are issued from the I-Cache to each of the E-boxes simultaneously and executed accordingly. The instructions to be executed in parallel are transferred to the E-boxes (i.e. placed on the bus) in the form of a single so called "very long instruction word" (VLIW). Executing many instructions simultaneously or in parallel allows a computer to accomplish its processing tasks much faster than conventional machines having a single E-box.

However, most general purpose computer programs (e.g. spread sheets etc.) are not able to take advantage of computer system 10's ability to process many instructions in parallel. The reason for this incompatibility is that general purpose computer programs are typically comprised of linearly order sets of instructions where a currently executing instruction depends on the instructions preceding having been executed in order to produce a proper result. As such, executing several instructions in parallel that depend on each other will not produce the program's expected results or at least would require enough re-execution to defeat the advantage of executing several instructions in parallel.

Still referring to FIG. 1, also included in computer system 10 is instruction monitor and control unit 16, and memory reference instruction controller 15. Instruction monitor and control unit 16 and memory reference instruction controller 16 provide a computer having multiple E-boxes with the ability to execute general purpose computer programs while taking full advantage of the parallel nature of the computer. The instruction monitor and control unit 16 is off the critical path of moving instructions through the processor and therefore does not slow down processing. The memory reference instruction controller 15 is on the path of moving date through the processor 18 but it is not on the cache or memory read path. Instruction monitor and control unit 16 and memory reference instruction controller 15 will be described in detail below.

In order to execute a general purpose computer program on computer system 10, the high level program will be used as an input to a compilation process whereby the instructions are translated into machine readable code and are then rearranged such that the linear dependency described above is alleviated.

As shown in Table 1, typical general purpose computer program which is

TABLE 1

| Logical Program |
|---|
| 1 STOR ADDR20, R0 |
| 2 ADD R0, R1, R20 |
| . |
| . |
| . |
| 20 LD ADDR1, R1 |
| 21 ADD R1, R2, R3 |
| 22 STOR ADDR2, R3 |
| 23 LD ADDR3, R5 |
| 24 ADD R5, R6, R7 |
| 25 STOR ADDR4, R7 |
| 26 LD ADDR5, R9 |
| 27 ADD R9, R10, R11 |
| 28 STOR ADDR6, R11 |
| . |
| . |
| . |
| n STOR ADDR50, R10 | intended to be executed on a conventional computer system includes a finite set of sequentially ordered instructions. This set of instructions, or so called "logical program", is usually provided as the output of a so called compiler which translates high level computer programming language instructions into a set of executable or machine readable instructions. In order to guarantee that the program operate properly and produce expected results, the computer processor must execute the instructions in sequential order as supplied by the compiler.

In order for a computer processor to execute multiple instructions simultaneously it is desirable to present to the processor, groups of instructions which are not dependent on each other in order to execute properly. To do so requires the reordering of the machine instructions. To illustrate, consider the sequential instruction list shown in the Table 1. When the instructions are executed in the order shown the logical (or correct) result will be provided. Now consider a set of instructions which includes all of the instructions from the logical program but not necessarily in sequential order. This reordered set of instructions will be called the physical program.

Ideally, the physical program would be a totally random rearrangement of instructions. However, there are certain rules which must be adhered to during rearrangement which will ensure proper results during execution. During rearrangement, additional information is added to each computer instruction. The information added to each instruction is enough to allow reconstruction of the logical program from the physical program. According to one embodiment of the present invention, the information added to each computer instruction is a serial number representing the order in which the instructions should be executed.

Due to constraints on the number of bits allowed for storing the serial number information, rather than number the instructions from, for example, 1 to 99999 (which would require 17 bits), the serialization will be done using a modular numbering scheme. For example, if 10 bits are available to store the serial number for each instruction then the instructions would be numbered form 0 to 1023 in a repeating pattern. It should be noted that in any interval in the sequence of operations, that is less than ½ the modulus (in this case 512), the operations are linearly ordered and uniquely identified by the serial numbers. It follows therefore that in any interval of operations which includes less than 512 operations, the order of these instructions can be randomized and the correct sequential order could be determined by the associated serial number. As a result of the limited number of bits and the modular numbering scheme, the rearrangement of operations will be done according to the following rule: Any two operations that are not closer in the logical program than ½ of the serial number modulus, may not have their positions interchanged. This rule ensures that during execution of the operations it can be determined which operation logically precedes or follows another operation.

Referring Table 2, as an illustration, consider a set of 32 linearly ordered operations or instructions 30 and select a modulus of 8 (or 3 bits). Using a modulus of 8, would result in operation groups A–H, I–P, Q–X, and Y–FF having serial numbers 0–7 assigned in a repeating fashion to each instruction in each group. It may be helpful to think of each serial number as identifying an instruction position within a particular group of instructions. Applying the rule above, only operations closer than ½ the modulus of the serial number may have their positions exchanged and may result in the reordering of operations as shown in the third column of Table 2. Note that no operation within any set of serial numbers 0–7 is rearranged to a new position which is more than four positions away from its starting position. For example, operation M which has a corresponding serial number of 4 has been reordered to the position previously occupied by instruction O (serial number 6). This represents a move of two positions which less than ½ the modulus or four. If a rearrangement of more than four positions was allowed, then it would not be possible to correctly determine the logical order of the instructions during execution. During execution of the physical program, the serial numbers are used to determine whether the next instruction to be executed logically precedes or follows the instruction which has just been executed. The usefulness of this information will be discussed later. To determine whether a next instruction logically follows or precedes a current instruction, a binary add of the 2's compliment of the serial number of the present instruction and

TABLE 2

| 1 | INSTRUCTION | A | 0 | INSTRUCTION | C | 2 |
| 2 | INSTRUCTION | B | 1 | INSTRUCTION | E | 4 |
| 3 | INSTRUCTION | C | 2 | INSTRUCTION | B | 1 |
| 4 | INSTRUCTION | D | 3 | INSTRUCTION | A | 0 |
| 5 | INSTRUCTION | E | 4 | INSTRUCTION | D | 3 |

TABLE 2-continued

| 6 | INSTRUCTION | F | 5 | INSTRUCTION | H | 7 |
| 7 | INSTRUCTION | G | 6 | INSTRUCTION | G | 6 |
| 8 | INSTRUCTION | H | 7 | INSTRUCTION | L | 3 |
| 9 | INSTRUCTION | I | 0 | INSTRUCTION | F | 5 |
| 10 | INSTRUCTION | J | 1 | INSTRUCTION | J | 1 |
| 11 | INSTRUCTION | K | 2 | INSTRUCTION | I | 0 |
| 12 | INSTRUCTION | L | 3 | INSTRUCTION | K | 2 |
| 13 | INSTRUCTION | M | 4 | INSTRUCTION | N | 5 |
| 14 | INSTRUCTION | N | 5 | INSTRUCTION | P | 7 |
| 15 | INSTRUCTION | O | 6 | INSTRUCTION | M | 4 |
| 16 | INSTRUCTION | P | 7 | INSTRUCTION | O | 6 |
| 17 | INSTRUCTION | Q | 0 | INSTRUCTION | S | 2 |
| 18 | INSTRUCTION | R | 1 | INSTRUCTION | R | 1 |
| 19 | INSTRUCTION | S | 2 | INSTRUCTION | Q | 0 |
| 20 | INSTRUCTION | T | 3 | INSTRUCTION | T | 3 |
| 21 | INSTRUCTION | U | 4 | INSTRUCTION | V | 5 |
| 22 | INSTRUCTION | V | 5 | INSTRUCTION | U | 4 |
| 23 | INSTRUCTION | W | 6 | INSTRUCTION | W | 6 |
| 24 | INSTRUCTION | X | 7 | INSTRUCTION | X | 7 |
| 25 | INSTRUCTION | Y | 0 | INSTRUCTION | Z | 1 |
| 26 | INSTRUCTION | Z | 1 | INSTRUCTION | BB | 3 |
| 27 | INSTRUCTION | AA | 2 | INSTRUCTION | Y | 0 |
| 28 | INSTRUCTION | BB | 3 | INSTRUCTION | AA | 2 |
| 29 | INSTRUCTION | CC | 4 | INSTRUCTION | DD | 5 |
| 30 | INSTRUCTION | DD | 5 | INSTRUCTION | FF | 7 |
| 31 | INSTRUCTION | EE | 6 | INSTRUCTION | CC | 4 |
| 32 | INSTRUCTION | FF | 7 | INSTRUCTION | EE | 6 | the serial number of the next instruction is performed. If the sign bit of the result indicates a positive result, then the next instruction logically follows the current instruction. Conversely, if the sign bit of the result is negative then the next instruction logically precedes the current instruction. So, for example, if the serial number of the current instruction had the value of 4 (100) and the serial number of the next instruction had the value of 2 (010), a binary add of 2 with the 2's compliment of 4 (100) would result in a binary value of 110 which represents a value of −2 thereby indicating that next instruction logically precedes the current instruction.

At this point it can now be understood why the reordering of instructions can not exceed positional moves greater than ½ the modulus. Consider the case if instruction V (number 22, serial number 5) were reordered to the position of instruction Q (number 17, serial number 0)—a move of greater than 4 positions. If the instruction immediately following instruction V at its new position was instruction R (number 18, serial number 1), then during execution, a binary add of the value 1 (001) with the 2's compliment of the value 5 (011) would yield a binary value of 100 which represents the value −4. This would indicate that the instruction with serial number 5 logically precedes the instruction with serial number 1 which in this case is incorrect. It should be noted that the rearrangement of instructions can cross the boundary of repeating serial numbers as long as the ½ modulus rule is adhered to. This condition is shown by rearranged instructions F and L in column 3 of Table 2. This will still allow reconstruction of the logical program from the physical program as desired.

It should also be noted that a range of serial numbers from 0–7 was chosen for simplicity of illustration and is not a limitation of the present invention. In fact, the only limitation on the range of serial numbers is the number of available bits for each instruction. For example, using serial numbers in the range of 0–1023 (or 10 bits) allows for rearrangement of instructions up to 512 positions from their original position in the logical program. This would allow considerable amount of rearrangement of instructions.

A second piece of information which is added to each VLIW instruction is a so called "commit" number. The commit number is used during execution of the physical program to indicate how much of the actual logical program has been completed at a particular point during execution of the physical program. The importance of this information will be discussed later.

Referring to Table 3, to illustrate what a commit number represents, consider the set of instructions which represent a portion of a physical program. The physical program of Table 3 is a rearrangement of the logical program in Table 1. If the point of execution of the physical program is at location A, it is known that instructions with serial numbers 20,23, and 26 have been executed. Although three instructions have been executed by the processor in "physical" terms, in logical terms the program has only completed up to the instruction having serial number

TABLE 3

Physical Program

| Serial # | Instruction | | Commit # | |
|---|---|---|---|---|
| . | | | | |
| . | | | | |
| . | | | | |
| 20 | LD | ADDR1, R1 | 20 | |
| 23 | LD | ADDR3, R5 | 20 | |
| 26 | LD | ADDR5, R9 | 20 | A |
| 21 | ADD | R1, R2, R3 | 21 | |
| 27 | ADD | R9, R10, R11 | 21 | |
| 22 | STOR | ADDR2, R3 | 23 | |
| 24 | ADD | R5, R6, R7 | 24 | B |
| 28 | STOR | ADDR6, R11 | 24 | |
| 25 | STOR | ADDR4, R7 28 | | |
| . | | | | |
| . | | | | |
| . | | | | |

20. This is so since instructions with serial numbers 21, 22, 24, and 25, have yet to be executed by the processor. As such, the VLIW (which includes instructions having serial numbers 20, 23, and 26 will have a commit number of 20.

As a further example, consider the same set of instructions except at this point the execution by the processor in physical terms has proceeded to point B. This indicates that the processor has executed four more instructions, namely serial numbers 21, 27, 22, and 24. Here it can be seen that although seven total instructions have been executed in physical terms, only 5 instructions have completed or committed in logical terms. Therefore, the VLIW instruction at point B will have a commit number of 24. A commit number tells the executing processor that it will not encounter any instructions in the future which have serial numbers which precede the commit number. Commit numbers become useful during execution, particularly when a program branch is taken and returned from. This condition will be discussed below.

In accordance with the present invention, an additional rule is established which must be applied during rearrangement of the logical program in order to guarantee proper logical results while executing the physical program. The rule is a so called "Register Data Precedence" (RDP) rule. Under the RDP rule if an instruction needs data from a register which is supplied to the register from a previous instruction, the receiving instruction cannot be reordered in the physical program to occur prior to the instruction which places the required data in the register. For example, referring back to Table 1, a portion of a logical program may contain the instruction sequence as shown. The instruction sequence includes individual instructions 20 through 28. Instruction 20 is a so called "load" instruction. This instruction would cause the data at a memory address ADDR1 to be placed into register R1. Instruction 21 is a so called "add" instruction. This instruction would cause the data in registers R1 and R2 to be added together and place the result in register R3. Instruction 22 is so called "store" instruction. This instruction would cause the data in register R3 to be placed in memory at an address ADDR2. It can be seen that in order for the correct data to be stored in address ADDR2, instruction 22 should not be executed before instruction 21 which likewise should not be executed before instruction 20. As a result, a rearrangement of the instruction set in Table 1 may look like the instruction set in Table 3. It can be seen that instructions 20, 23, and 26 may be executed in parallel since they are mutually independent instructions. Likewise instructions 21 and 27 may be executed in parallel as well as instructions 22, 24 and 28.

It should be noted that the rule regarding register data precedence only applies to references to registers and does not apply to data passing through memory. Memory references are here reordered arbitrarily with any reordering problems being handled by memory reference instruction controller 15 (FIG. 1). Additionally, branch instructions and memory references can be executed out of order and in accordance with the present invention, the proper logical result is assured.

Figure 2:
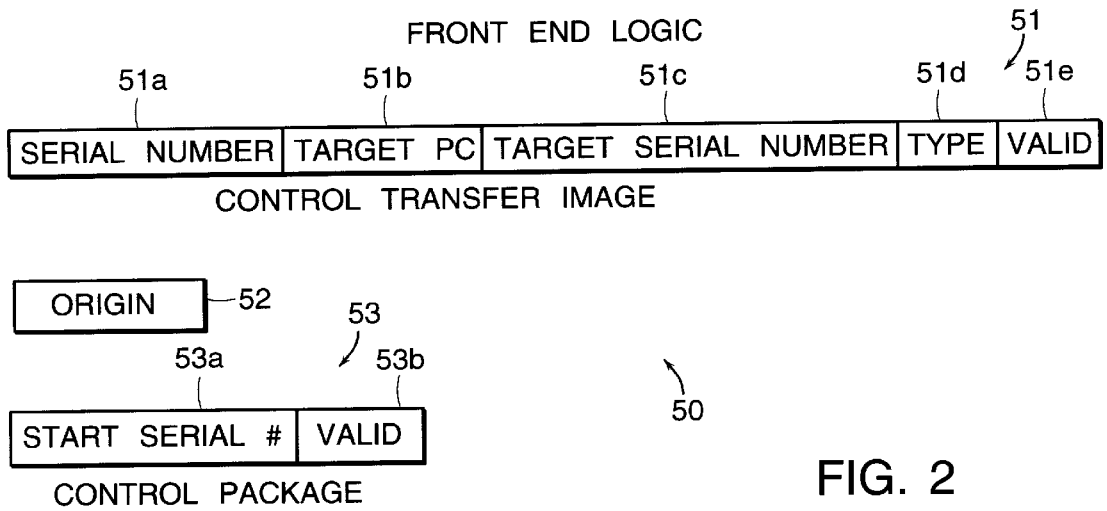
FIG. 2 is a diagram of the storage registers included in instruction monitor and control unit of the computer system in FIG. 1.

We now turn our consideration to the hardware which is used to process the above-described physical program. Referring now to FIG. 2, instruction monitor and control unit 50 is shown to further include three storage registers, a control transfer image register 51, an origin register 52, and a control package register 53. Control transfer image register 51 includes storage for all information associated with instructions which might cause a so called "control flow change". A control flow change instruction is a branch or jump instruction, exception, or interrupt. Branch and jump instructions are identified by decoding the instruction while exception conditions are detected by logic during the course of executing an instruction and are signalled back to the instruction monitor and control unit 16 (FIG. 1). An interrupt is signalled by an external agent such as an input/output device. When such a control flow change is encountered, and no previous control flow change instructions have been encountered, the information concerning this instruction is stored in the control transfer image register 51. Generally, register 51 is used to store information regarding the most relevant control flow change.

As a number of program instructions are executed in parallel, nothing out of the ordinary happens except in the case when a control flow change is encountered. A control flow change is identified when an opcode of a branch is executed and the conditions for branching are satisfied or when a jump is executed, or an exception is signalled on any instruction, or an interrupt is signalled. When a branch or jump instruction is encountered, no control flow change is forced immediately (i.e., the value of the program counter is not changed immediately). As discussed earlier, instructions do not actually execute until they are committed. In the case of a branch or jump, this is important, since there may be an instruction that logically preceded the jump which has not yet been encountered (i.e. issued to an E-box). Therefore, at this point in time, the information regarding the control flow change is captured in register 51. Register 51 stores the serial number, the so called "target program counter address" (target PC), and the so called "target serial number", as well as the type of control flow change and a valid bit in storage locations 51a–51e respectively. The target program counter address is the address at which instructions will begin executing when the control flow operation is actually executed. The target serial number is the serial number associated with the instruction that is the logical target of the control flow change. This instruction and those that logically follow it should properly be executed. If another control flow change had previously been stored (which is determined by examining the valid field 51e), a comparison is done between the serial number stored in the control transfer image and the serial number of the latest encountered control flow change to determine which control flow change is logically earlier. If the newly encountered control flow change is logically earlier than the previously stored control flow change, then the information associated with the newly encountered control flow change is stored in place of the previously stored information. Additionally, as each VLIW instruction is executed, the commit number is examined. When the commit number of a VLIW instruction equals or exceeds the serial number in the control transfer image register 51 then the described control flow change is actually performed. That is, when the commit number of the group of instructions that are executing now equals or exceeds (modularly) the serial number field of the control transfer image, then the control flow is actually performed as explained below.

Figure 3:
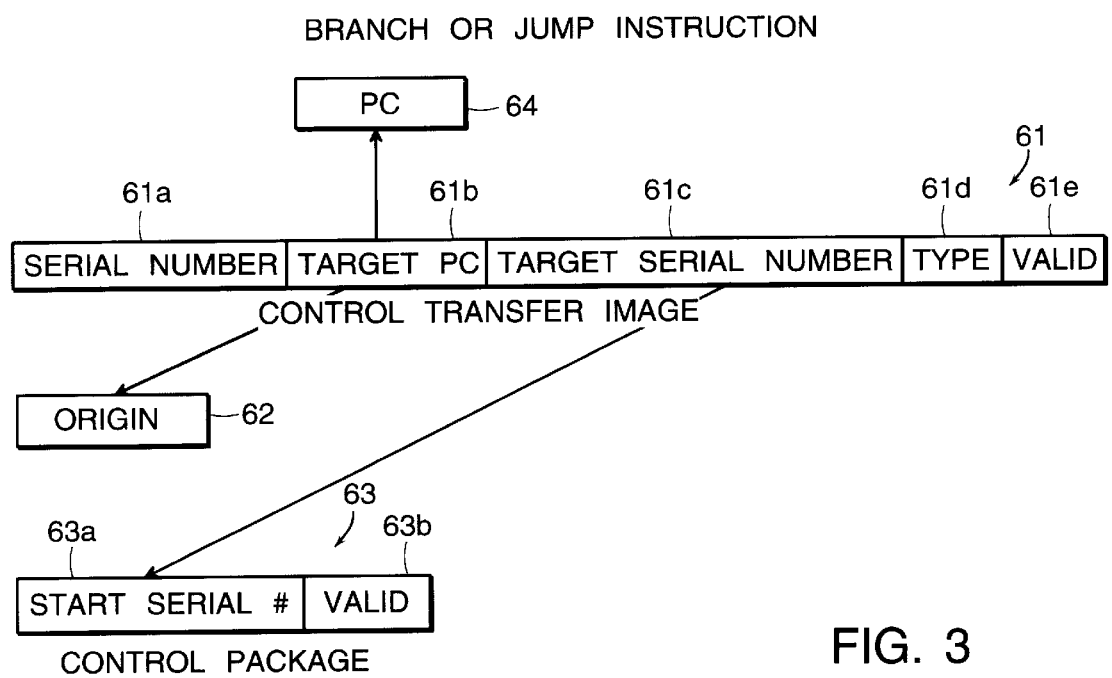
FIG. 3 is a diagram of the data transfers which take place in the instruction monitor and control unit of FIG. 2 when a branch or jump instruction is committed.

Referring now to FIG. 3, in order to perform a control flow change, the contents of register 61, in particular the target PC 61b, is copied to origin register 62 and to the PC 64 while the target serial number 61c is copied to the start serial number field 63a of the control package which is made valid by setting its corresponding valid bit 63b. The control transfer image 61 is also made invalid by setting its corresponding valid bit 61e to 0. Additionally, execution of the instructions now begins at the target PC previously loaded into the control transfer image and now also residing in the PC 64. In this way, a branch or jump is taken in what might be known as a conventional manner. If the control flow change was an exception or an interrupt, a similar procedure is followed.

Figure 4:
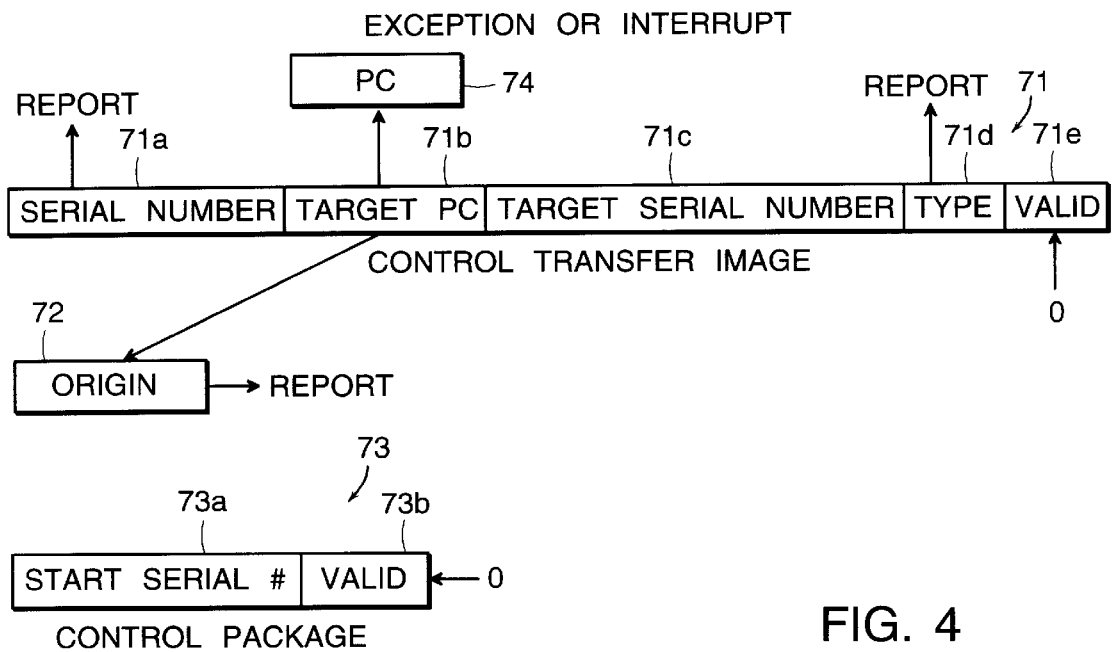
FIG. 4 is a diagram of the data transfers which take place in the instruction monitor and control unit of FIG. 2 when a exception or interrupt is committed.

Referring now to FIG. 4, when the control flow change that has committed is an exception or interrupt, as can be determined by type field 71d, the serial number 71a previously stored in the control transfer image (to identify the precise logical point of exception or interrupt) as well as the type field 71d of the control transfer image are reported to the operating system. In addition, the contents of origin register 72 is also reported to the operating system. After that information has been reported to the operating system, then the information from the control transfer image (i.e. the target PC 71b) is stored in the origin register 72, and in the PC 74. The target PC 71b, in this case, will describe the entry point to an interrupt or exception service routine which will now be executing. Note also that the contents of control package register 73 have been made invalid by setting valid bit 73b to 0.

Performing a jump or branch, exception, or interrupt can be thought of as moving to a different segment leg in the physical program and beginning execution from that point. At this point, execution of instructions begins at a new program counter location.

However, each instruction encountered after beginning execution at the new PC address is not necessarily executed. Referring back to FIG. 2, when encountered, each instruction's serial number is compared to the start serial number which has been stored in the control package register 53a. If the serial number of the instruction encountered is less than the serial number stored in control package register 53a and valid bit 53b is set to the value 1, then the instruction is ignored. This prevents executing instructions which logically should not properly be executed because they logically precede the entry point of the control flow change. Once all instructions having serial numbers which require that they be ignored have been exhausted, the valid bit 53b of control package register is set to zero. This condition is satisfied when the commit number of the currently executing group of instructions equals or exceeds (modularly) the value stored in the start serial field 53a.

If a control flow change is an exception or an interrupt as opposed to a branch or a jump, the mechanism for transferring operation of instructions to a new location is the same a described above for a branch or a jump. However, the code executed will be the exception or interrupt handler which is usually part of the operating system. The exception or interrupt will perform its task, whatever that task is, and then execution will return to the exact point in the program where it left.

Figure 5:
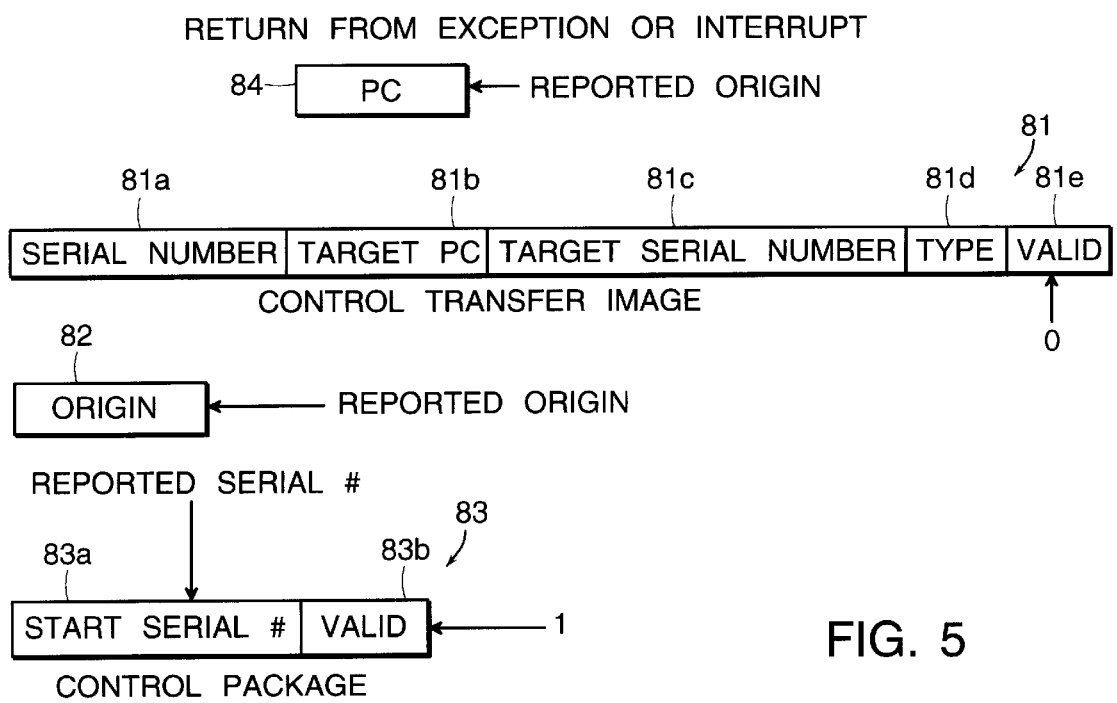
FIG. 5 is a diagram of the data transfers which take place in the instruction monitor and control unit of FIG. 2 when a return from exception or interrupt is performed.

Referring now to FIG. 5, to accomplish a return from interrupt or exception, use is made of the information that was captured from registers 71a and 72 (FIG. 4). Recall that the serial number of the excepting instruction and origin was captured from registers 71a and 72 respectively. The return from an exception or interrupt entails putting that information back and then doing the actual return (i.e., beginning instructions at the proper PC).

The first consideration on returning from an exception or interrupt is the serial number of the instruction to return to. Upon return from an interrupt or exception, a value is placed back in the start serial number field 83a of the control package 83. However, there are two possibilities at this point in time. In some cases, it is necessary to go back and repeat the instruction that caused the exception or interrupt if, for example, that instruction had a problem and the exception was taken to fix it. When the problem is corrected it is necessary to re-execute the instruction which caused the exception or interrupt. An example of when to re-execute, upon return, the instruction which caused the interrupt or exception is a so called "page fault". A page fault can occur when an attempt is made to access a certain page of memory only to discover that the page is not in memory. This causes an exception, invoking the page fault handler, which causes the page of memory to be retrieved off the disk and placed in memory. Once this is accomplished, it is necessary to go back and do the load instruction over again in order to retrieve the correct information from memory. The second possibility is to consider the instruction that caused the exception to be completed and therefore, upon return, execution is started at the logically following instruction.

In order to re-execute the instruction that caused an exception, the serial number which was reported to the operating system when the exception was detected is placed back in the start serial number field 83a. If the instruction which caused the exception is to be considered completed, the same procedure is followed however, the serial number that was reported is incremented by one (modularly) and placed in start serial number field 83a of the control package. In either event, the valid bit 83b is set to make this start serial number valid. Another value that was reported, when the exception was taken, and saved while the exception handler was operating, is the value from the origin register 72 (FIG. 4). That saved value is put back in the origin register 82 thereby restoring the origin register to the state it was in at the time the exception was taken. For the control transfer image, the only thing that needs to be done is to make it invalid by resetting its valid bit 81e. This indicates that there are no pending control transfers. The reported origin is also put back in the PC 84 which is where program execution resumes. When the PC is loaded with the value from the reported origin, instructions will automatically be fetched starting at that location. It should be noted that implicit in above explanation concerning exceptions and interrupts is that all the things that are usually done in a conventional computer are also done here. For example, as with a completely conventional computer, all of the registers would be saved when the exception is taken and would have been restored upon completion of the exception or interrupt.

At this point, execution resumes and includes the filtering process described above in connection with branch and jump operations. That is, since there is a value in the start serial number field 83a, every instruction up to and possibly including or possibly not including the one that caused the exception (depending on the type of exception) will be filtered out (as they have already been completed) and all instructions with a serial number following the one stored in the start serial number field 83a will be executed.

Referring back to FIG. 3, recall that the origin register 62 gets loaded when a jump is actually performed (i.e. is committed). As can be seen in FIG. 3, the origin register 62 is loaded with the value from the target PC 61b. The origin register 62 may also be loaded when originally entering the program as if there were a return from exception or interrupt. If the origin register 62 had been loaded when originally entering the program, the value in the origin register would be the address of the physical entry point into the program.

There needs to be an instruction so the executing software can actually load the origin with some new number such that, as the software is executing, instruction after instruction, from time to time, the origin is advanced so that it is not always pointing back to the beginning of the program flow.

Additionally, there are some rules regarding advancing the origin. The basic rule is that the origin must point to a location which precedes all uncommitted instructions. The reason for this rule is that if an exception occurs, which could happen at any instruction, the origin indicates where execution begins upon return from the exception. That location needs to be early enough so that every instruction that logically follows the one that caused the exception will be encountered. In fact, the instruction that caused the exception is the last committed instruction.

All uncommitted instructions will be re-executed upon return from the exception so the origin has to be before those uncommitted instructions. In general, it would be advantageous to advance the origin and bring it as close to the currently executing instruction as possible. However, the origin can not be advanced past uncommitted instructions. So, as the software continues to execute a number of instructions will be committed. Once these instructions have been committed, the origin can be advanced. The software will continue executing, committing more instructions, at which time the origin can be advanced further. This general pattern continues throughout execution of the software.

There is another reason why the origin must be advanced and that reason is related to running out of serial numbers. Recall that the serial numbers are issued on a modular basis. As such, a rule is established which states that serial numbers from the origin to the execution point must be unambiguously ordered. If the origin is left pointing back to the beginning of the program flow, and program execution continues without advancing the origin, more and more serial numbers are used as execution continues until fully, all serial numbers have been exhausted. The only way to recover useable serial numbers is to advance the origin. Advancing the origin frees all the serial numbers that are before the origin.

Basically, the return from exception or interrupt is a matter of taking the information that was captured when the exception was taken and putting it back. The important thing is what address at which to start fetching instructions. That address is the origin that was reported to the operating system and then put back in the PC 84 (FIG. 5). When execution resumes, it is possible to get another exception. So, in case another exception occurs, there must be a suitable value in the origin register.

The other piece of information needed upon return from an exception is, where does execution "logically" begin. It is important to know in logical terms, exactly which instruction is being returned to so that the returned to instruction and all the instructions logically following it are executed. This information is placed in the start serial number register 83a, and is used as filter criteria when execution resumes upon from the exception.

Figure 6:
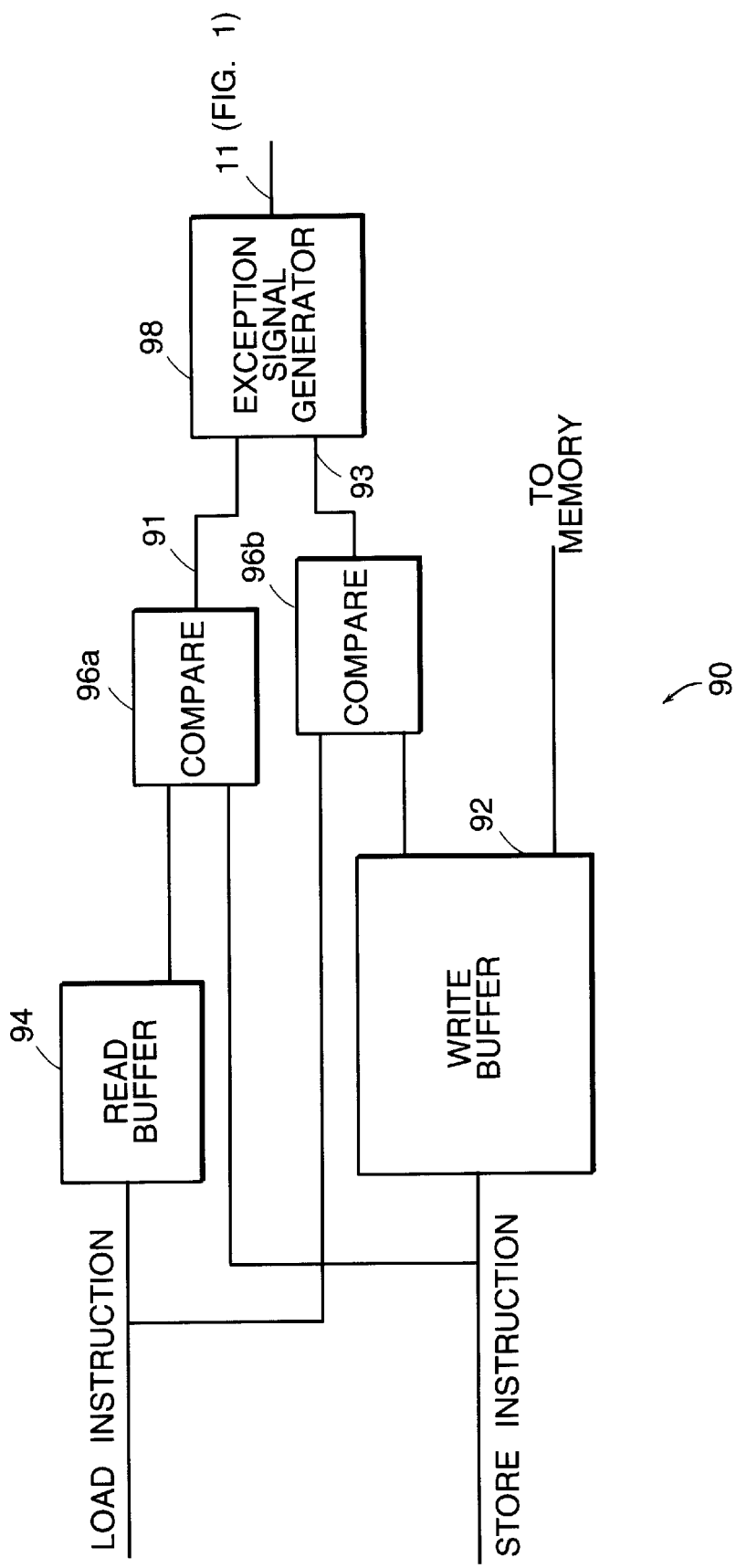
FIG. 6 is a block diagram of memory reference instruction controller of the computer system of FIG. 1.

Referring now to FIG. 6, memory reference instruction controller 90 is shown to include write buffer 92, read buffer 94, compare units 96a and 96b and exception signal generator 98, coupled to compare units 96a and 96b via signal lines 91 and 93 respectively. Since, as described above, many instructions may be executing in parallel and further, may be executing out of order, it is necessary to be able to resolve memory references which occur out of order. That is, if for example a load instruction is done prior to a store instruction which intended to provide the information for the load instruction, it is imperative to sort out and make sure that the load instruction does actually obtain the correct data from memory. This function is provided by the memory reference instruction controller 90.

Recall that the memory reference instruction controller 90 does not interfere with reads from the cache so that the address that is to be read, as soon as it's generated, goes to the cache which is followed by a data lookup and a data return to the E-box (FIG. 1). Although the back-end logic 90 does not interfere with these operations, it does monitor all that is going on, and receives a copy of the address supplied to the cache. Even in the event of a cache miss, reads can be done from memory with the back-end logic monitoring the reads and not interfering therewith.

The memory reference instruction controller 90 is however on the path of and is active in any writes to memory or cache. The two primary pieces of logic included in the back-end logic are the read buffer 94 and the write buffer 92. The read buffer 94 monitors all loads (i.e. reads from cache or memory) that are executed by the processor. The read buffer is a memory with records allocated for the storage of information concerning load instructions. In general, the read buffer 94 receives information that there was a load instruction in the form of the load instruction's serial number and the address to be accessed by the load instruction. This information is stored in a record within the read buffer 94. In fact, the read buffer 94 monitors and records every load that is executed. Since the read buffer is of a limited size, it is necessary to be able to flush or empty the buffer on occasion to avoid overflowing the read buffer's memory. Flushing the read buffer can occur in either one of two ways. The first method of flushing the read buffer is accomplished using the commit numbers associated with instructions.

Whenever an instruction is committed, there is no longer any need to have it stored in the read buffer. As commit numbers come in with groups of instructions going into the E-boxes, they are communicated to the read buffer which looks through its records and all entries that have serial numbers preceding or equal to that commit number are deleted. The space for those deleted entries is used over again for new entries. The second method of flushing the read buffer is related to control flow changes. When a control flow change is actually committed, the read buffer must get notified that there was a control flow change.

When there is control flow change, the read buffer is emptied. At that point, none of the information in the read buffer is needed. The reason for this is, at that point, the only thing that is in the read buffer is the uncommitted instructions. Since execution has "jumped" to a new location, those instructions in the read buffer are instructions that never should have been executed in the first place so they can be discarded without consequence.

Write buffer 92 actually has a similar function to read buffer 94. All store instructions (i.e., writes to cache or memory) actually go to the back-end logic, they do not go directly to the cache or to the memory. During each store instruction, the serial number and the address of the memory location along with the data to be written is supplied to the write buffer. So, the write buffer has all of the information needed to later place the information in memory.

The write buffer records this information in a way which is very similar to manner in which the read buffer records its information. That is, the write buffer is a memory with a limited amount of storage for recording information about store instructions. Every store that is executed, is recorded in an entry in the write buffer. Like the read buffer, the write buffer has limited storage and must be flushed periodically. Also like the read buffer, the write buffer is flushed when store instructions are committed but, here, the instructions are not simply discarded.

With the write buffer when the instruction is committed, the data from the store instruction is actually placed in the memory or in the cache. When a particular store instruction has committed, it is known that the write to memory should really take place and that is when it is written into memory or cache, and not before. Basically, any stores to memory are held in the write buffer until it is known that the operation should actually be performed. When a group of instructions is placed in respective E-boxes, the commit number associated with them gets transmitted to the write buffer and compared with the serial numbers of all the records stored in the write buffer. Every bufferred write instruction that has a serial number equal to, or preceding, the commit number transmitted from the E-boxes is released to memory.

At this point, in order to mimic the way in which a conventional machine would operate, the bufferred writes are released to memory in order, by serial number. Since the writes are released to memory in logical order, different writes to the same address that were logically supposed to be in a certain order, but were physically executed in the reverse order are sorted out. That is, the instructions went into the write buffer in backwards order, but in fact, they were sorted into the correct order when they finally went into memory.

The other way in which the write buffer is flushed is when there is a control flow change. First of all, when there is a control flow change that is actually executed (as described above) that fact is reported to the write buffer. Assuming now, that all instructions that are committed were released to memory and then there is a control flow change that is committed, everything else in the write buffer is just discarded. So, as a result of a control flow change that actually happens, the read buffer is empty and the write buffer is empty essentially providing a clean slate.

There are two other considerations with each load and store instruction. A compare operation is performed for every load instruction and for every store instruction. For every load operation a compare is performed by compare logic 96b between the current load instruction and everything that is stored in the write buffer. The compare is performed to find cases when the address for the load instruction matches an address that is stored in the write buffer. A match implies a store to this address was performed recently and the processor is trying to do a load from the same address. Once an address match is found, the serial numbers of the matching instructions are examined to see if the store in the write buffer is logically earlier than the load that is currently being executed. If the store in the write buffer is logically earlier, the new load instruction that is being processed and being stored in the read buffer should be returning the data that was stored via the store instruction with the earlier serial number.

At this point it is known that the processor did not get the correct data since it is recorded in the write buffer which means it has not yet gone to either the cache or memory. That is, when the processor, looked up this particular address in the cache, it found what was in the cache at that time but the data was not that which the processor should have received. To correct this problem, a so called "memory ordering exception" is declared. A memory ordering exception is a special type of exception that is declared by asserting a signal on dedicated signal line 11 (FIG. 1) and is used to indicate that memory ordering exception has occurred. Signal line 11 is actually a plurality of signal lines which carry the serial number of the instruction which caused the exception, back to the instruction monitor and control unit 16 (FIG. 1). When a memory reference causes an exception, the serial number of the instruction causing the exception is transmitted from compare units 96a or 96b via signal lines 91 or signal lines 93 respectively (depending on whether a load or store instruction caused the exception) to exception signal generator 98. Exception signal generator in turn passes the serial number of the exception causing instruction, along with signals indicating that an exception has occurred, back to instruction monitor and control unit 16 (FIG. 1).

In this case, the load instruction is the causing instruction. Declaring this exception puts it in competition with all the other control flow changes that may have been declared. As far as the processor is concerned, there is nothing special about this exception so it is arbitrated in the instruction monitor and control unit as described above with other control flow changes.

If and when the exception control flow change gets committed the usual sequence (described above) is followed to take the exception. The memory ordering exception handler does nothing but return from the exception. Upon return, execution resumes at a suitable address defined by the value saved in the origin register 82 (FIG. 5). The start serial number 83a (FIG. 5) identifies the faulty load instruction. The processor then executes the load instruction again and also executes every instruction which logically follows it. As before, operations logically preceding the load are filtered out.

In order for the exception to be committed, the causing instruction (i.e. the load in this case) must have committed. That is, when load instruction commits, the store instruction that has the data which is the object of the load instruction is logically earlier so it must have committed previously. Therefore, the data has gone to memory and the cache. Now, when the load is executed over again, it will get the correct data. By taking the exception on the load, memory and the cache are forced to be brought up to date enough such that the load can get the correct data.

As described above, each store instruction that is issued, is recorded in the write buffer. Additionally, every store instruction must be compared to everything that is stored the read buffer. The compare is done in order to determine if there are load instructions in the read buffer that represent loads that are logically later than the store instruction presently executing. Like load instructions, a compare is done to determine if there is an address match between the currently executing store instruction and any load instruction in the read buffer. If there is a match, the serial number of the store instruction is compared to the serial number of the matching load instruction. If the serial number of the load instruction is logically later than the serial number of the store instruction, the load instruction could not possibly have returned the correct data since the store instruction which was to have placed the data in memory for the load instruction is just now executing.

To alleviate this problem, a memory ordering exception is declared as described above for load instructions. Unlike the case for load instructions, a complication here is that there actually could have been a series of load instructions that were all referencing the same address and as such all have this problem. It would be possible to declare a series of exceptions but it is only necessary to declare an exception on the logically earliest load that has the problem.

In order to declare an exception on this load instruction it must not have committed yet. In this case, since the load instruction is in the read buffer, it is known implicitly that the instruction has not been committed. That is, since the store instruction itself has not committed yet or may be just getting committed, it is known that all loads that follow this store could not have committed yet. This ensures that all of the loads that reference the address of the logically earlier store instruction will in fact be in the read buffer. Since these instructions have yet to commit, exceptions can be declared for each one. It is however only necessary to declare an exception on the logically earliest one. The exception is performed as described above in connection with the load instructions. Once the exception itself has committed, which is effectively the time when the load tries to get committed, then the exception process is actually performed.

Notice that at this point, when the exception gets committed, the load is committed as well. Therefore the store that caused the problem, which is logically earlier, also gets committed thereby placing the data in memory and the cache. By taking this exception, the memory and cache are brought up to date as of that load instruction. That is, logically, memory and cache are brought up to the correct state such that, when the load is re-executed, it will get the correct data. It can be seen then that it is possible to arbitrarily order any loads and stores and still produce the correct result.

Having described a preferred embodiment of the invention, it will now become apparent, to one of skill in the art that other embodiments incorporating its concepts may be used. It is felt therefore, that this embodiment should not be limited to the disclosed embodiment, but rather should be limited only by the spirit and scope of the appended claims.

What is claimed is:

1. A method of operating a computer system including a central processing unit (CPU) and a memory, comprising the steps of:

constructing a physical program for execution by said CPU, said physical program including a plurality of computer instructions and constructed according to a method including the steps of:

adding a first type of information to a set of linearly dependent computer instructions said information corresponding to an order in which said set of computer instructions are arranged;

rearranging said set of linearly dependent computer instructions into a set of non-linearly dependent instructions with said added information allowing reconstruction of said set of linearly dependent computer instructions from said set of non-linearly dependent instruction sequence;

after said rearranging step, adding commit information to said set of non-linearly dependent computer instructions;

loading said physical program into said memory.

reading, by said CPU, a plurality of said physical program instructions; and executing said plurality of physical program instructions simultaneously.

2. The method of claim 1 wherein said first adding step includes assigning, in a modular fashion, a serial number to each instruction of said set of linearly dependent instructions; and wherein said second adding step includes assigning commit numbers to groups of said rearranged instructions, each of said commit numbers corresponding to one of said serial numbers and indicating that, upon execution of one of said groups, all of said rearranged instructions having serial numbers sequentially preceding said associated commit number have been executed.

3. The method of claim 2 wherein said step of reading further comprises the steps of:

simultaneously loading a plurality of said rearranged instructions into a plurality of execution means; and wherein the step of executing further includes the steps of:
determining if any of said plurality of instructions is attempting to cause said computer system to execute in a manner which deviates from sequential execution of said linearly dependent instructions;
recording information concerning said determined instructions to allow subsequent execution of said determined instructions.

4. The method of claim 2 further comprising the steps of:

storing information corresponding to each read operation in a read buffer;

comparing each write operation to each entry in the read buffer;

declaring a memory order exception if said compare of one of said write operations indicates that said one of said write operations is occurring after a read operation which should have preceded it;

storing information corresponding to each write operation in a write buffer; and comparing each read operation to each entry in the write buffer;

declaring a memory order exception if said compare of one of said read operations indicates that said one of said read operations is occurring after a write operation which should have preceded it.

5. A computer system comprising:

means for providing, from a first set of computer instructions arranged in a linearly dependent order, a second set of computer instructions, said second set of computer instructions being a non-linearly dependent rearrangement of said first set of computer instructions, each one of said second set of computer instructions having appended thereto a serial number corresponding to said linear arrangement of said first set of computer instructions to allow reconstruction of said first set of computer instructions and, subsets of said second set of computer instructions having appended thereto commit numbers corresponding to one of said serial numbers with said commit numbers indicating that, upon execution of one of said subsets, all of said second set of instructions having serial numbers sequentially preceding said commit number have been executed;

a memory;

means for loading said second set of computer instructions into said memory; and means for simultaneously executing, a plurality of said second set of computer instructions, said executing means providing results which are equivalent to an output provided by executing said first set of computer instructions one at a time and in a linear dependent order.

6. The computer system of claim 5 wherein said means for executing a plurality of a second set of computer instructions includes:

a plurality of execution means;

an instruction issuing means coupled to said plurality of execution means, said instruction issuing means capable of providing instructions to each of said execution means simultaneously;

an instruction control means for monitoring said plurality of instructions to determine if any one of said plurality of instructions is attempting to execute a branch, jump, interrupt or exception instruction; and means for reordering memory reference instructions executed out of correct linear order to provide execution of said memory reference instructions in correct linear order.

7. The computer system of claim 6 wherein said instruction control means further comprises a plurality of registers for storing information regarding said computer instructions which are branch jump, interrupt or exception instructions.

8. The computer system of claim 6 wherein said means for resolving out of order memory references includes means for storing information corresponding to a plurality of read operations and write operations to a memory; and means for comparing each memory reference instruction to each entry in said storing means.

9. A computer processor comprising:

means for issuing a plurality of instructions during a common processing cycles, said plurality of instructions being a non-linearly dependent rearrangement of a set of linearly dependent instructions and each of said plurality of instructions including a serial number which indicates the instruction's linear sequential order and subsets of said plurality instructions having appended thereto commit numbers;

means for monitoring said plurality of instructions to determine if any one of said plurality of instructions is a branch, jump, exception or interrupt type instruction;

a plurality of execution units for executing, during another common processor cycle, at least two of said plurality of instructions;

means for reordering memory reference instructions executed out of correct linear order to provide execution of said memory reference instructions in said correct linear order.

10. The computer processor of claim 9 wherein said monitoring means operates in response to values associated with said serial numbers and said commit numbers to detect when a particular one of said plurality of instructions is a branch, jump, exception or interrupt type instruction; and wherein said means for resolving operates in response to values associated with said serial numbers and said commit numbers to reorder said memory reference instructions executed out of correct linear order to provide execution of said memory reference instructions in said correct linear order.

11. A computer processor comprising:

an instruction cache coupled to a computer memory said memory containing a plurality of instructions which are a rearrangement of a plurality of linearly dependent instructions into a plurality of non-linearly dependent computer instructions and each of said rearranged instructions including a serial number which indicates the instruction's linear sequential order prior to rearrangement, and subsets of said rearranged instructions having appended thereto commit numbers, for issuing a subset of said plurality of instructions during a common processing cycle;

an instruction monitor for monitoring said plurality of instruction to determine if any one of said plurality of instructions is a branch, jump, interrupt or exception type instruction;

a plurality of execution units for executing during another common processor cycle at least two of said plurality of instructions;

a memory buffer for reordering memory reference instructions executed out of correct linear order to provide execution of said memory reference instructions in said correct linear order.

12. The computer processor of claim 11 wherein said instruction monitor operates in response to values associated with said serial numbers and said commit numbers to detect when a particular one of said plurality of instructions is attempting to cause execution which deviates from said linear sequential order; and wherein said memory buffer operates in response to values associated with said serial numbers and said commit numbers to reorder said memory reference instructions executed out of correct linear order to provide execution of said memory reference instructions in said correct linear order.

13. The computer processor of claim 11 wherein said memory buffer further comprises:

a read buffer for storing information regarding each read memory reference instruction;

a write buffer for storing information regarding each write memory reference instruction;

a first compare unit for comparing each of said read memory reference instructions to every entry in said write buffer;

a second compare unit for comparing each of said write memory reference instructions to every entry in said read buffer;

an exception signal generate for providing a signal, in response to an output from either said first or said second compare units, to indicate that a memory reference instruction is attempting to be executed out of correct linear order.

14. The computer processor of claim 11 wherein said instruction monitor includes a plurality of registers for storing information regarding said particular one of said plurality of instructions which is a branch, jump, interrupt, or exception type instruction.

* * * * *